United States Patent
Doetsch et al.

(10) Patent No.: US 6,792,036 B2
(45) Date of Patent: Sep. 14, 2004

(54) METHOD FOR ESTIMATING CHANNEL IMPULSE RESPONSES OF A MOBILE RADIO CHANNEL

(75) Inventors: Markus Doetsch, Schliern (CH); Tideya Kella, München (DE); Peter Schmidt, Erpolzheim (DE); Peter Jung, Otterberg (DE); Jörg Plechinger, München (DE); Michael Schneider, Münichen (DE)

(73) Assignee: Infineon Technologies AG, Munich (DE)

( * ) Notice: Subject to any disclaimer, the term of this patent is extended or adjusted under 35 U.S.C. 154(b) by 42 days.

(21) Appl. No.: 10/058,527

(22) Filed: Jan. 28, 2002

(65) Prior Publication Data

US 2002/0141483 A1 Oct. 3, 2002

Related U.S. Application Data

(63) Continuation of application No. PCT/DE00/02503, filed on Jul. 28, 2000.

(30) Foreign Application Priority Data

Jul. 28, 1999 (DE) .......................................... 199 35 480

(51) Int. Cl.[7] .................................................. H04B 1/69
(52) U.S. Cl. ....................... 375/149; 375/368; 375/364; 375/342; 375/355
(58) Field of Search .................................. 375/130, 149, 375/145, 134, 136, 137, 368, 365, 366, 364, 355, 356, 357, 342

(56) References Cited

U.S. PATENT DOCUMENTS

| | | | |
|---|---|---|---|
| 5,465,276 A | 11/1995 | Larsson et al. | |
| 5,619,524 A | 4/1997 | Ling et al. | |
| 5,648,983 A | 7/1997 | Kostic et al. | |
| 5,818,876 A | 10/1998 | Love | |
| 5,859,570 A | 1/1999 | Itoh et al. | |
| 5,862,192 A | 1/1999 | Huszar et al. | |
| 5,909,447 A | 6/1999 | Cox et al. | |
| 5,930,366 A | 7/1999 | Jamal et al. | |
| 6,067,333 A | 5/2000 | Kim et al. | |
| 6,169,759 B1 * | 1/2001 | Kanterakis et al. | ......... 375/130 |

FOREIGN PATENT DOCUMENTS

| | | |
|---|---|---|
| WO | WO 98/51017 | 11/1998 |
| WO | WO 99/20061 | 4/1999 |

OTHER PUBLICATIONS

Ojanperä, T. et al.: "Wideband CDMA for Third Generation Mobile Communications", Artech House, pp. 170–173;.

* cited by examiner

Primary Examiner—Emanuel P Bayard
Assistant Examiner—Pankaj Kumar
(74) Attorney, Agent, or Firm—Laurence A. Greenberg; Werner H. Stemer; Gregory L. Mayback

(57) ABSTRACT

A method is described for estimating channel impulse responses of a mobile radio channel with a broad bandwidth by a code division multiplexing method, and with a synchronization channel continuously transmitting sequences to mobile radio receivers. The sequences are provided for synchronization of each mobile radio receiver and are known to each of the mobile radio receivers. The transmitted sequences have pilot symbols for identifying the synchronization channel, and the pilot symbols are transmitted at points that are known to the receivers within a time slot. When searching for and identifying the synchronization channel, the pilot symbols and, possibly, further symbols and sequences which are known in the receivers, are evaluated to estimate the delay times and the complex amplitudes, of the mobile radio channel responses.

14 Claims, 1 Drawing Sheet

METHOD FOR ESTIMATING CHANNEL IMPULSE RESPONSES OF A MOBILE RADIO CHANNEL

CROSS-REFERENCE TO RELATED APPLICATION

This application is a continuation of copending International Application No. PCT/DE00/02503, filed Jul. 28, 2000, which designated the United States.

BACKGROUND OF THE INVENTION

FIELD OF THE INVENTION

The invention relates to a method for estimating a channel impulse response of a mobile radio channel in a downlink mobile radio channel in a code division multiple access system that has a common synchronization channel provided for synchronization of each mobile radio receiver. Via the common synchronization channel, sequences are continuously transmitted to a plurality of mobile radio receivers. The sequences are known to each of the mobile radio receivers, and the sequences transmitted have pilot symbols for identifying the common synchronization channel. The pilot symbols are transmitted at points that are known to the mobile radio receivers within a time slot.

In order to achieve good transmission quality in mobile radio systems, it is particularly important to know the channel impulse response of a mobile radio channel. This is the only way in which it is possible to adequately remove distortion in a receiver from a signal that is transmitted via the mobile radio channel, for subsequent evaluation. The more accurately the channel impulse response of the mobile radio channel is known in the receiver in this case, the better the removal of distortion and the evaluation processes can be carried out for a received signal.

Normally, the channel impulse response of a mobile radio channel in code division multiple access (CDMA) mobile radio systems is estimated by estimating the delay time and subsequently estimating the complex amplitude or amplitude and phase of a signal which is transmitted via that mobile radio channel. Since mobile radio channels vary with time, both the delay time and the complex amplitude, or amplitude and phase, must be estimated continually by a receiver. This is normally done in the receiver either by iterative tracking of the signal, or by averaging the signal.

In the third-generation UMTS (Universal Mobile Telecommunications System) CDMA mobile radio system, pilot symbols are used for this purpose, which are transmitted at defined points, known to the receiver, within a slot or time slot, for example at the start, which is available to a mobile radio subscriber for receiving signals. The pilot symbols are in this case transmitted via a synchronization channel, which is a downlink channel.

However, the channel impulse response is not estimated until the process of acquiring the synchronization channel in the mobile radio receiver has been completed. In addition, the two-step process of estimating the channel impulse response—estimation of the delay, and only then estimation of the weighting factors—is not optimal, since the mobile radio channel varies with time and, particularly in the case of a mobile radio receiver operating at high speed, changes its characteristics continuously, thus resulting in inaccurate estimation results.

Section 6.3.3.2, on pages 171 to 173, of the book titled "Wideband CDMA for Third Generation Mobile Communications" by T. Ojanperä et al., Artech House Publishers, Boston, 1998, describes the use of a common synchronization channel for synchronization of a large number of mobile radio receivers to a base station. The channel estimation process is carried out using pilot symbols, which are transmitted in a dedicated channel, or in a common control channel BCCH.

U.S. Pat. No. 5,619,524 describes a method for channel estimation, in which pilot symbols are used both for channel estimation and for time synchronization. The pilot symbols are transmitted from the mobile station to a base station, via a dedicated channel during uplink operation.

U.S. Pat. No. 5,818,876 describes a method for channel estimation, in which pilot symbols are used both for time synchronization and for channel estimation in a communications system.

SUMMARY OF THE INVENTION

It is accordingly an object of the invention to provide a method for estimating channel impulse responses of a mobile radio channel which overcomes the above-mentioned disadvantages of the prior art methods of this general type.

The invention relates to a method for estimating the downlink channel impulse responses of a mobile radio channel, referred to as mobile radio channel impulse responses in the following text, in a CDMA system which has a common synchronization channel provided for synchronization of each mobile radio receiver. Via the common synchronization channel, sequences are continuously transmitted to a large number of mobile radio receivers, which are known a priori to each of the large number of mobile radio receivers, with the transmitted sequences having pilot symbols for identifying the synchronization channel. The pilot symbols are transmitted at points that are known to the receivers within a time slot. According to the invention, when searching for and identifying the synchronization channel, the pilot symbols, which are known to the mobile radio receivers, and, possibly, further symbols and sequences which are known in the receiver are evaluated in order to estimate the delay times and the complex amplitudes, that is to say amplitudes and phases, of the mobile radio channel impulse responses.

The combined estimation of the mobile channel impulse response advantageously considerably improves the results of the estimation process, compared to a multistage sequential estimation method.

The pilot symbols and, possibly, further symbols and sequences which are known in the receiver, for example as a result of a prior decision, are preferably evaluated while searching for and identifying the synchronization channel during slot synchronization. In particular, further sequences, which are transmitted via a further synchronization channel, are additionally used for estimating the delay time and the weighting factors of the transfer function of the mobile radio channel.

In one preferred embodiment of the method, the mobile radio channel impulse response is in each case estimated on receiving a pilot symbol or a pilot symbol sequence at the start of a time slot. This embodiment is advantageously used at low mobile radio receiver speeds, up to about 100 km/h. Additionally, the pilot symbol or sequence of pilot symbols can be received at the end or any point in the time slot.

At higher mobile radio receiver speeds, the mobile radio channel impulse responses change so quickly that it is not sufficient to estimate them once per slot or time slot. The mobile radio channel impulse response is therefore estimated a number of times within a current time slot, preferably by linear interpolation or prediction, for example based on the estimates of the mobile radio channel impulse responses which have each been obtained once per slot or time slot on the basis of pilot symbols. The embodiment is particularly suitable for accurate estimation of the mobile radio channel impulse responses for data rates up to 64 kbps and a spread factor of 32 or more. Furthermore the data and monitoring information, which is transmitted between the pilot symbol in the previous time slot and the pilot symbol in the current time slot, can be buffer-stored.

If the data rate rises at higher speeds, then the mobile radio channel impulse responses are preferably estimated by prediction, based on the mobile radio channel impulse responses which were obtained in the two slots or time slots preceding the current slot or time slot. This embodiment is computation-intensive.

A programmable or adaptively controllable threshold value criterion is preferably used for deciding on the use of one of the preceding methods.

Furthermore, the number of sample values for estimating the mobile radio channel impulse responses is programmed as a function of the estimation accuracy to be achieved. This is because, if a received signal has a high spread factor, there is no need to take account of all the sample values of the signal for estimating the mobile radio channel impulse responses, so that the computation complexity for carrying out the method is reduced.

In accordance with an added mode of the invention, there is the step of evaluating the pilot symbols while searching for and identifying the common synchronization channel during slot synchronization.

In accordance with an additional mode of the invention, there is the step of using further symbols, which are known in the mobile radio receiver for the prediction or the interpolation.

In accordance with another mode of the invention, there is the step of estimating the mobile radio channel impulse responses by linear prediction or nonlinear prediction from the pilot symbols in two time slots preceding a current time slot.

In accordance with a further mode of the invention, there is the step of using a programmable threshold value criterion or an adaptively controllable threshold value criterion for a decision.

In accordance with a further added mode of the invention, there is the step of using a primary synchronization channel in a universal mobile telecommunications system mobile radio standard as the common synchronization channel for the slot synchronization.

In accordance with another additional mode of the the invention, there is the step of using a secondary synchronization channel in a universal mobile telecommunications system mobile radio standard as the further synchronization channel.

In accordance with a concomitant mode of the invention, there is the step of using the further sequences for estimating complex phases of the mobile radio channel impulse responses.

Other features which are considered as characteristic for the invention are set forth in the appended claims.

Although the invention is illustrated and described herein as embodied in a method for estimating channel impulse responses of a mobile radio channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
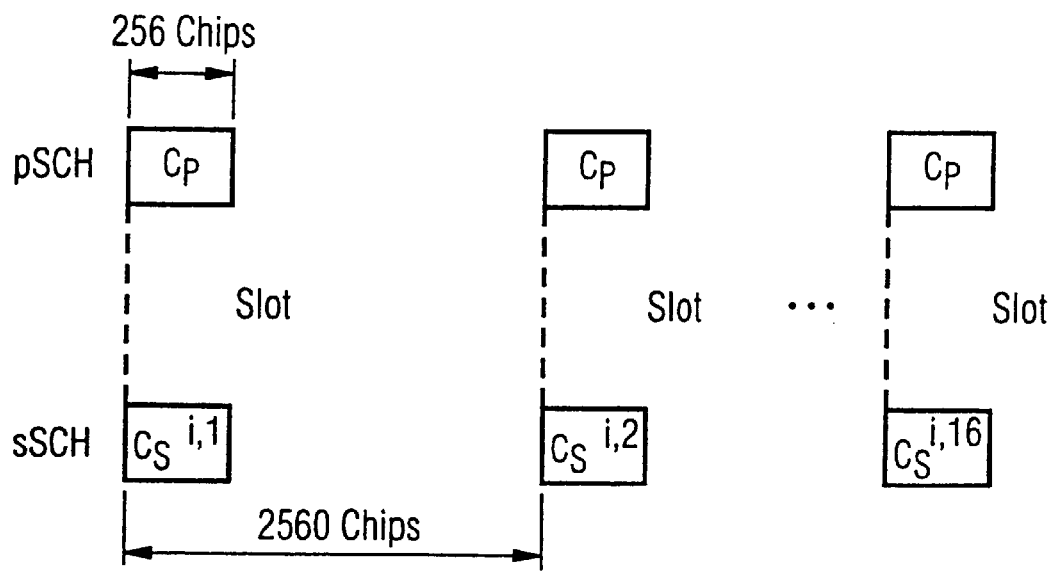
FIG. 1 is a block diagram of a structure of channels provided for synchronization in a UMTS mobile radio system according to the invention.

Referring now to the figures of the drawing in detail and first, particularly, to FIG. 1 thereof, there is shown a structure of channels provided for synchronization in the third-generation UMTS mobile radio system.

A first synchronization channel pSCH (primary synchronization channel) and a second synchronization channel sSCH (secondary synchronization channel) respectively have a first synchronization code and a second synchronization code within a slot or time slot. Overall, 2560 chips are transmitted in one slot, of which the first 256 chips are used for the first and second synchronization code. First synchronization codes $c_p$ (primary synchronization codes), which are always the same, are transmitted at the start of a slot in the first synchronization channel. In contrast, different second synchronization codes $c_s^{i,k}$ are transmitted at a start of each slot in the second synchronization channel. A total of 17 possible second synchronization codes $c_s^{i,k}$ are provided in this case.

The following text contains a rough description of the steps that are carried out when a mobile radio receiver "registers" in a UMTS mobile radio system.

In a first step, the mobile radio receiver attempts to register in the mobile radio system using the first synchronization channel pSCH (primary synchronization channel), in order to carry out slot synchronization. The slot synchronization is used for accurate time synchronization in the mobile radio receiver. For this purpose, the mobile radio receiver has a filter, which is matched to the synchronization code of the first synchronization channel. The first synchronization code is in this case the same for all the radio cells in the mobile radio system, so that it is sufficient simply to carry out the filter for identifying or "filtering out" the synchronization code from all the received signals.

Frame synchronization is carried out in a second step, after accurate time synchronization to the slot. In UMTS, a frame in the first and second synchronization channels contains 16 slots. A code group, to which the radio cell belongs, is now determined on the basis of the second synchronization channel (sSCH (secondary synchronization channel), whose position is known to the mobile radio receiver on the basis of the synchronization in the first step. To do this, the received signal is correlated with all the possible second synchronization codes $c_s^{i,k}$ at those positions in the second synchronization code which are known on the basis of the accurate time synchronization in the first step. The correlations are used to derive decision variables, which are used to determine the code group of the radio cell. The receiver is thus at the same time synchronized to the frame structure of the synchronization channel.

In a third, and final, step, the accurate first spread code (primary scrambling code), which is used by the identified radio cell, is determined. The correlation maximum then corresponds to the accurate first spread code.

Figure 2:
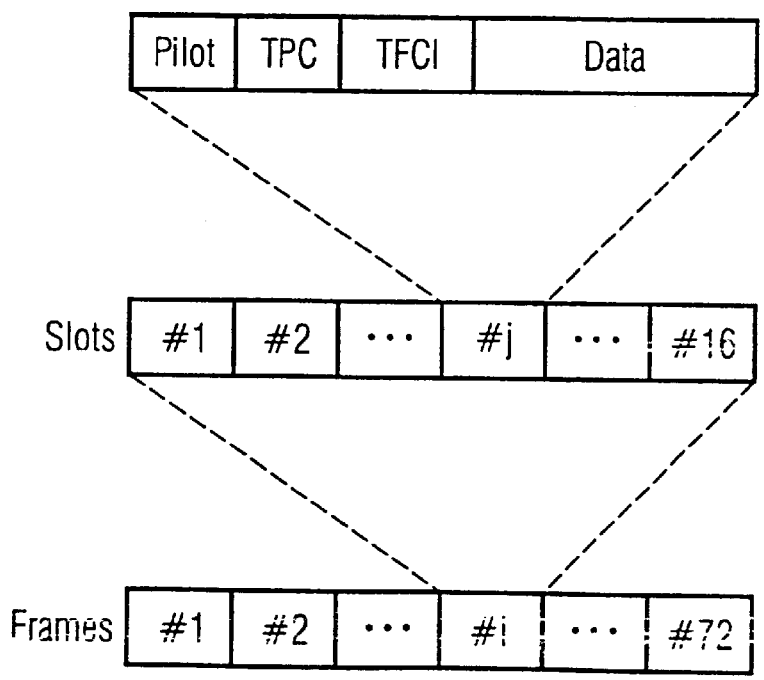
FIG. 2 illustrates a frame structure of a dedicated physical channel (DPC) in a UMTS mobile radio system.

FIG. 2 shows the frame structure of a downlink dedicated physical channel (Downlink DPCH). The DPC has 72 frames, each of which has 16 slots or time slots. Each slot starts with a pilot symbol, followed by a TPC symbol or a TFCI symbol, and the data bits. The TPC and TFCI symbols contain monitoring information for the receiver. Each frame lasts for 10 ms, and each slot for 0.625 ms.

Three different methods are available for estimating the channel impulse response:

1. estimation by pilot integration;
2. estimation by pilot integration and prediction or interpolation by evaluating the pilot symbol in the current or preceding slot; and
3. estimation by pilot integration and prediction or interpolation by evaluating the pilot symbols in the two preceding slots.

The estimation process is preferably carried out by a signal processor.

In the case of estimation by pilot integration, the mobile radio channel impulse responses are estimated while receiving a pilot symbol in a slot. Since the transmitted pilot symbol is known to the receiver, the mobile radio channel impulse responses can easily be estimated on the basis of the received pilot symbol. This method is particularly applicable for receiver speeds up to about 100 km/h.

The second method is used for data rates up to 64 kbps and at high speeds, as well as for spread factors of not less than 32. In a case such as this, the mobile radio channel impulse responses change very quickly, so that estimation of the mobile radio channel impulse responses using the received pilot symbols at the start of a slot is highly inaccurate even by the end of the slot or, in the case of very high receiver speeds, even before the end of the slot, and no longer matches the actual channel characteristics. It is therefore necessary to track the change in the mobile radio channel impulse responses between two successive pilot symbol sequences. The data and monitoring information between the two successive pilot symbol sequences is in this case determined on the basis of the mobile radio channel responses estimated by interpolation between the two pilot signal sequences. However, the data and monitoring information in a slot must be buffered to do this. The formula for determining the mobile radio channel impulse responses is:

$$h(n) = h(0) + \frac{h(N_S) - h(0)}{N_S} \cdot n$$

The mobile radio channel impulse responses h at a time n are in this case determined by interpolation between the mobile radio channel impulse responses at the time 0 and at the time $N_s$ at the end of the slot. The time $N_s$ corresponds to the total number of symbols in the slot.

The third method is suitable for very high speeds and a high data rate. In a case such as this, the current mobile radio channel impulse responses always differ from the mobile radio channel impulse responses estimated by pilot integration at the start of a slot. Estimation is therefore carried out by pilot integration and interpolation by evaluation of the pilot symbols in the two preceding slots. The formula for determining the channel impulse response in this case is:

$$h(n) = h(N_S) + \frac{h(N_S) - h(0)}{N_S} \cdot n$$

In this case, there is no need to buffer the data and monitoring information in a slot, since the pilot symbols of the two preceding slots are used for interpolation.

We claim:

1. A method for estimating mobile radio channel impulse responses in a downlink mobile radio channel in a code division multiple access system, which comprises the steps of:
   providing a common synchronization channel for synchronization of each mobile radio receiver;
   transmitting, via the common synchronization channel, sequences continuously to a plurality of mobile radio receivers, the sequences being known to each of the mobile radio receivers, the sequences transmitted having pilot symbols for identifying the common synchronization channel, and the pilot symbols being transmitted at points which are known to the mobile radio receivers within a time slot;
   searching for and identifying the common synchronization channel; and
   when searching for and identifying the common synchronization channel, evaluating the pilot symbols in the sequences, known to the mobile radio receivers, to jointly estimate delay times and complex amplitudes of the mobile radio channel impulse responses when searching for and identifying the common synchronization channel.

2. The method according to claim 1, which comprises evaluating the pilot symbols while searching for and identifying the common synchronization channel during slot synchronization.

3. The method according to claim 1, which comprises:
   transmitting further sequences, via a further synchronization channel; and
   using the further sequences for estimating the delay times and the complex amplitudes of the mobile radio channel impulse responses.

4. The method according to claim 1, which comprises estimating the mobile radio channel impulse responses in each case on receiving one of a pilot symbol and a pilot symbol sequence at one of a start of the time slot, an end of the time slot, and any position in the time slot.

5. The method according to claim 1, which comprises estimating the mobile radio channel impulse responses by one of prediction and interpolation of one of a previous pilot symbol and a previous pilot symbol sequence received in a previous time slot, and one of a current pilot symbol and a current pilot symbol sequence in a current time slot.

6. The method according to claim 5, which comprises using further symbols, which are known in the mobile radio receiver for the prediction or the interpolation.

7. The method according to claim 5, which comprises buffer storing data and monitoring information transmitted between a last pilot symbol in the previous time slot and a first pilot symbol in the current time slot.

8. The method according to claim 1, which comprises estimating the mobile radio channel impulse responses by one of linear prediction and nonlinear prediction from the pilot symbols in two time slots preceding a current time slot.

9. The method according to claim 1, which comprises using one of a programmable threshold value criterion and an adaptively controllable threshold value criterion for a decision.

10. The method according to claim 1, which comprises programming a number of sample values for estimating the delay times and the complex amplitudes as a function of an estimation accuracy to be achieved.

11. The method according to claim 2, which comprises using a primary synchronization channel in a universal mobile telecommunications system mobile radio standard as the common synchronization channel for the slot synchronization.

12. The method according to claim 3, which comprises using a secondary synchronization channel in a universal mobile telecommunications system mobile radio standard as the further synchronization channel.

13. The method according to claim 1, which comprises during the evaluating step, evaluating further symbols and sequences which are known to the mobile radio receivers as a result of prior decisions to assist in the joint estimation of the delay times and the complex amplitudes of the mobile radio channel responses when searching for and identifying the common synchronization channel.

14. The method according to claim 3, which comprises using the further sequences for estimating complex phases of the mobile radio channel impulse responses.

* * * * *